US012643440B2

(12) United States Patent
Zhang

(10) Patent No.: US 12,643,440 B2
(45) Date of Patent: Jun. 2, 2026

(54) LATERAL ROTARY POSITIONING MECHANISM AND CHILD CARRIER

(71) Applicant: Wonderland Switzerland AG, Steinhausen (CH)

(72) Inventor: Daliang Zhang, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 89 days.

(21) Appl. No.: 18/690,618

(22) PCT Filed: Sep. 9, 2022

(86) PCT No.: PCT/EP2022/075181
§ 371 (c)(1),
(2) Date: Mar. 8, 2024

(87) PCT Pub. No.: WO2023/036964
PCT Pub. Date: Mar. 16, 2023

(65) Prior Publication Data
US 2024/0375562 A1 Nov. 14, 2024

(30) Foreign Application Priority Data
Sep. 10, 2021 (CN) .......................... 202111065556.5

(51) Int. Cl.
*B60N 2/28* (2006.01)
*B60N 2/90* (2018.01)

(52) U.S. Cl.
CPC ......... *B60N 2/2869* (2013.01); *B60N 2/2821* (2013.01); *B60N 2/919* (2018.02); *B60N 2002/952* (2018.02)

(58) Field of Classification Search
CPC ..... B60N 2/2869; B60N 2/2821; B60N 2/919
See application file for complete search history.

(56) References Cited

U.S. PATENT DOCUMENTS

| | | | |
|---|---|---|---|
| 6,196,629 B1* | 3/2001 | Onishi ................. | B60N 2/2869 297/256.13 |
| 2009/0091167 A1* | 4/2009 | Jha ..................... | B60N 2/42709 297/256.12 |
| 2014/0084650 A1* | 3/2014 | Rabeony .............. | B60N 2/2863 297/256.12 |

FOREIGN PATENT DOCUMENTS

| | | |
|---|---|---|
| CN | 1254312 A | 5/2000 |
| CN | 205470836 U | 8/2016 |

(Continued)

OTHER PUBLICATIONS

Office Action issued in corresponding Taiwanese Application No. 111134176 dated Jun. 14, 2023.

(Continued)

*Primary Examiner* — Justin M Benedik
(74) *Attorney, Agent, or Firm* — Volpe Koenig

(57) ABSTRACT

The present disclosure discloses a lateral rotary positioning mechanism arranged between a base and a body, the base is rotatably arranged on the body and includes an engaging pin and an engaging recess, the engaging pin is telescopically arranged on the body, the engaging recess is arranged on a bottom surface of the base and at least one side of the base in a lateral direction, and when the base is rotated to a lateral direction with respect to the body, the engaging pin is inserted into the engaging recess to limit rotation of the base. The lateral rotary positioning mechanism capable of being rotatable to a lateral direction to position the carrier of the present disclosure has advantages of a simple structure and capability of improving the use convenience and safety of the child carrier. In addition, the present disclosure also discloses a child carrier.

17 Claims, 12 Drawing Sheets

<u>100</u>

(56)        References Cited

FOREIGN PATENT DOCUMENTS

| | | | | | |
|---|---|---|---|---|---|
| CN | 207565395 | U | 7/2018 | | |
| CN | 211641927 | U | 10/2020 | | |
| CN | 211765089 | U | 10/2020 | | |
| CN | 112060993 | A | 12/2020 | | |
| CN | 113276740 | A | 8/2021 | | |
| DE | 69808973 | T2 | 8/2003 | | |
| DE | 202017105584 | U1 | 1/2019 | | |
| EP | 3750743 | A1 | 12/2020 | | |
| JP | H10-250426 | A | 9/1998 | | |
| JP | 2001-206116 | A | 7/2001 | | |
| JP | 3210033 | U | 4/2017 | | |
| JP | 2019-131111 | A | 8/2019 | | |
| JP | 2020-533232 | A | 11/2020 | | |
| JP | 2020-199861 | A | 12/2020 | | |
| JP | 2021123123 | A | 8/2021 | | |
| TW | 202128459 | A | 8/2021 | | |
| WO | WO-2012146761 | A1 * | 11/2012 | ............. | B60N 2/286 |
| WO | WO-2021051057 | A1 * | 3/2021 | ........... | B60N 2/2851 |

OTHER PUBLICATIONS

International Search Report and Written Opinion for Application
No. PCT/EP2022/075181 dated Jan. 2, 2023.
"First Office Action Issued in Corresponding Taiwan Patent Appli-
cation No. 113135060", Mailed Date: Feb. 18, 2025, 11 pages.
"First Office Action Issued in Corresponding Japanese Patent Appli-
cation No. 2024-515520", Mailed Date: Mar. 18, 2025, 15 pages.
First Office Action for corresponding Chinese Application No.
2021110655565 dated Jan. 16, 2026, 15 pages.

* cited by examiner

100

LATERAL ROTARY POSITIONING MECHANISM AND CHILD CARRIER

CROSS-REFERENCE TO RELATED APPLICATIONS

The present application is a national phase application under 35 U.S.C. 371 of International Application No. PCT/EP2022/075181 filed on Sep. 9, 2022, and claims priority to Chinese application No. 202111065556.5 filed Sep. 10, 2021, the entire contents of which are incorporated herein by reference.

TECHNICAL FIELD

The present disclosure relates to a child carrier, in particular to a lateral rotary positioning mechanism which can be rotated to a lateral direction for positioning and a child carrier having the same.

BACKGROUND

At present, child safety seats capable of rotating forward and rearward in market may be generally rotated to a front direction or a rear direction. When the carrier is in a state of being rotated to the front direction or the rear direction, a locking mechanism may lock the seat, so that a child can sit facing the front direction or the rear direction. When the child gets off the car or is carried out of the car, the child will face a door of the car. However, most of the child safety seats have no temporary positioning function when they are rotated to a lateral direction. Therefore, the seats are easy to swing and rotate when the child is getting off the car. This negatively affects the child to move in and out of the car, and is inconvenient for the child to get in and out of the seat, and even easy to fall down.

SUMMARY

An object of the present disclosure is to provide a lateral rotary positioning mechanism capable of positioning a carrier when the carrier is rotated to a lateral direction, which has a simple structure, and can improve the convenience and safety of using a child carrier.

Another object of the present disclosure is to provide a child carrier capable of being positioned when the carrier is rotated to a lateral direction, which is convenient and safe to use.

In order to achieve the above objects, the lateral rotary positioning mechanism provided by the present disclosure is arranged between the base and the body, the base is rotatably arranged on the body, and includes an engaging pin and an engaging recess, the engaging pin is telescopically arranged on the body, and the engaging recess is arranged on a bottom surface of the base and located on at least one side of the base in a lateral direction, and when the base is rotated to the lateral direction with respect to the body, the engaging pin is inserted into the engaging recess to limit rotation of the base.

Compared with the prior art, the engaging pin is arranged on the body, and the engaging recess is arranged on the bottom surface of the base, and the engaging recess is located on at least one side of the base in the lateral direction, and therefore, when the base is rotated to the lateral direction with respect to the body, the engaging pin may be inserted into the engaging recess, thereby limiting the rotation of the base, and the base may be stably in a state towards the lateral direction, so that it is convenient to take the child in or out of the carrier body, to improve the use experience and satisfaction, and avoid the rotation of the carrier body in use so as to prevent the child from falling down and ensure safety of use. In addition, the base can be unlocked only by driving the engaging pin out of the engaging recess, and specifically, the engaging pin can be disengaged from the engaging recess by directly rotating the carrier body, thereby providing good use convenience and use experience.

In an embodiment, the lateral rotary positioning mechanism also includes an elastic restoring element which is arranged between the body and the engaging pin to push the engaging pin to be inserted into the engaging recess. The elastic restoring element is used to enable the engaging pin to automatically be inserted into the engaging recess, so that the base may be automatically locked when it turns to the lateral direction, to effectively improve the convenience of use.

In an embodiment, the bottom surface of the base is provided with an annular guide groove concentric with the base, and the engaging recess is arranged within the annular guide groove. The annular guide groove may slidably contact with the engaging pin, so as to guide the base to be rotated, and may accurately guide the engaging pin to slide into the engaging recess, thereby improving the smoothness of the rotation and the accuracy of positioning by the pin in the lateral direction.

In an embodiment, the lateral rotary positioning mechanism further includes a positioning block, which is arranged on the bottom surface of the base and provided with a engaging recess. The base is made of plastic materials and has a poor wear resistance, and the engaging recess is directly arranged on the base, which easily leads to material abrasion, and therefore, the positioning block can reduce the abrasion speed and degree of the engaging recess and prolong the service life. Moreover, even if the abrasion occurs, it can be replaced quickly and conveniently.

Specifically, a mounting part is arranged on each of both ends of the positioning block, and the mounting parts are connected to the bottom surface of the base.

Specifically, mounting grooves are arranged on the bottom surface of the base, and the mounting parts are embedded in the mounting grooves. With the combination of the mounting groove and the mounting part, the positioning block can be accurately and quickly assembled to the base, thereby improving the convenience of assembly and maintenance.

Specifically, the mounting part and the base are connected in a manner of screw connection, bolt connection, snap connection, bonding or welding.

Specifically, the positioning block is a wear-resistant positioning block made of wear-resistant materials.

In an embodiment, each of both sides of the engaging recess are provided with a guiding slope, for guiding the engaging pin to be engaged in or out. By providing the guiding slope, the guiding slope may guide the engaging pin, and therefore, when the base is rotated, the guiding slope may be used to force the engaging pin to move out of the engaging recess, thereby achieving the purpose of quick unlocking and improving the convenience of operation.

A child carrier includes a carrier body, a base, a body and a lateral rotary positioning mechanism, the carrier body is arranged on the base, and the base is rotatably arranged on the body around its central axis.

In an embodiment, the bottom surface of the base is provided with a locking hole, and the locking hole is located at front or rear side of the base, and when the base is rotated to a rear direction or a front direction with respect to the body, the engaging pin is inserted into the locking hole to limit the rotation of the base. The locking hole is arranged at the front or rear side of the base, so that the base may be locked by the engaging pin when the base is arranged in the rear direction or the front direction to be positioned in the rear direction or the front direction, and the safety in use can be ensured.

Specifically, the base is provided with an unlocking mechanism for driving the engaging pin out of the locking hole. By providing the unlocking mechanism, the base may be quickly unlocked, thus improving the convenience of operation.

Specifically, the unlocking mechanism comprises a slider which is slidably arranged on the base to push the engaging pin out of the locking hole.

Specifically, the unlocking mechanism also includes a driving element, a middle of the driving element is pivotally connected to the base, and one end of the driving element is connected with the slider to move the slider when the other end of the driving element is driven.

Specifically, the unlocking mechanism also includes an elastic element, which is arranged between the base and the slider to restore the slider. By providing the elastic element, the slider may be automatically away from the engaging pin, so that the engaging pin can be automatically locked, and the accidental pushing of the engaging pin can be avoided, and thus the safety of operation can be improved.

Specifically, the unlocking mechanism further includes an operating element which is slidably arranged on a side of the base and connected with the other end of the driving element. The operating element is arranged outside the base, which is convenient for the user to operate and improves the convenience of use.

Specifically, the unlocking mechanism also includes a restoring element, which is arranged between the base and the operating element to restore the operating element. By providing the restoring element, the operating element may be automatically restored, and the effectiveness of the operation in every time can be improved.

Figure 1:
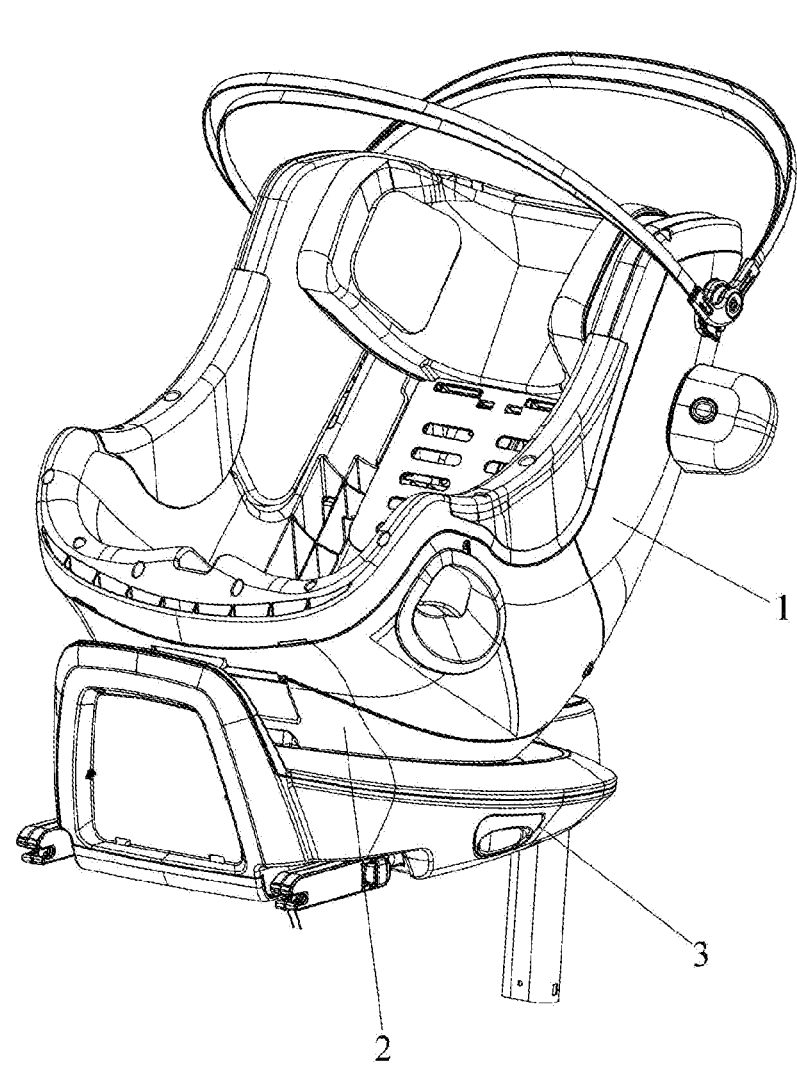
FIG. 1 is a perspective view of a child carrier according to an embodiment of the present disclosure when it is used in a rear direction.

Child Carrier 100
Carrier Main Body 1
Base 2
Body 3
Lateral Rotary Positioning Mechanism 4
Unlocking Mechanism 5
Annular Guide Groove 21
Mounting Groove 22
Locking Hole 23
Cavity 31
Engaging Pin 41
Engaging Recess 42
Elastic Restoring Element 43
Positioning Block 44
Mounting Part 441
Mounting Hole 441a
Guiding Slope 421
Slider 51
Driving Element 52
Elastic Element 53
Operating Element 54
Restoring Element 55

DETAILED DESCRIPTION

The detailed description will be made in conjunction with the embodiments and drawings in order to explain the technical contents, structural features and achieved effects of the present disclosure in detail.

FIGS. 1 to 8 show a structure of a child carrier 100 according to an embodiment of the present disclosure.

Referring to FIGS. 1 to 4, the child carrier 100 of the present disclosure includes a carrier main body 1, a base 2, a body 3 and a lateral rotary positioning mechanism 4. The carrier main body 1 is arranged on the base 2. The body 3 is provided with a cavity 31, and the base 2 is rotatably arranged on the body 3 around its central axis and covers the cavity 31. The lateral positioning mechanism 4 is arranged between the base 2 and the body 3 to position the base 2 towards a lateral direction.

Figure 3:
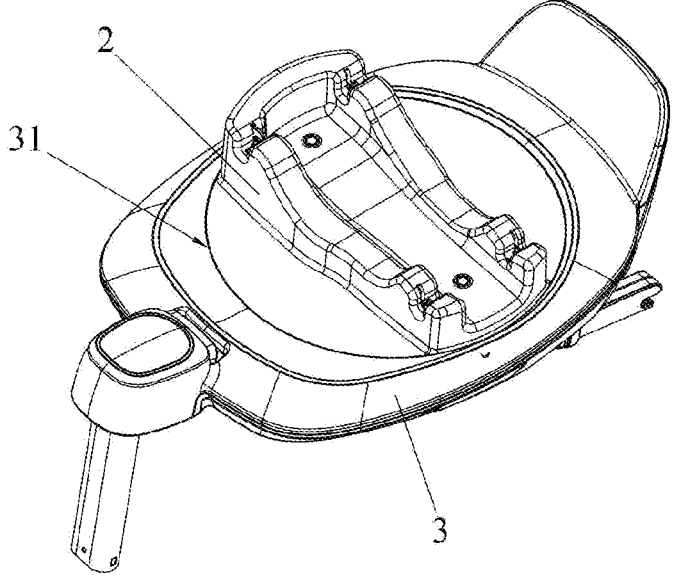
FIG. 3 is a perspective view of the base and the body of the child carrier according to the first embodiment of the present disclosure when it is used in a lateral direction.
Figure 4:
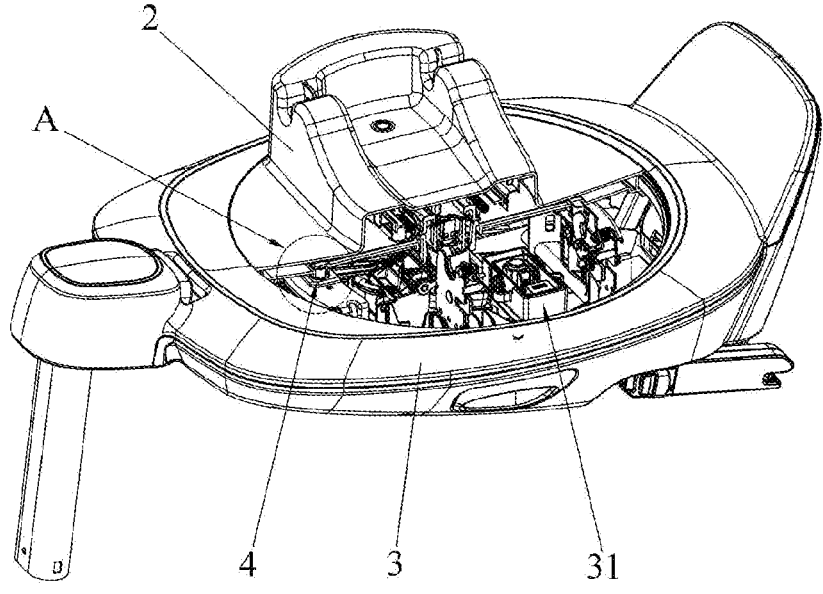
FIG. 4 is an internal structural view of the base and the body of the child carrier according to the first embodiment of the present disclosure.

It should be noted that when the child carrier 100 is used in a front or rear direction, a longitudinal axis of the base 2 of the child carrier 100 is parallel to a longitudinal axis of the main body 3; and when the child carrier 1 is used in the lateral direction, that is, "positioned towards the lateral direction" as described above, the longitudinal axis of the base 2 is perpendicular or substantially perpendicular to the longitudinal axis of the body 3, as shown in FIG. 3.

Figure 5:
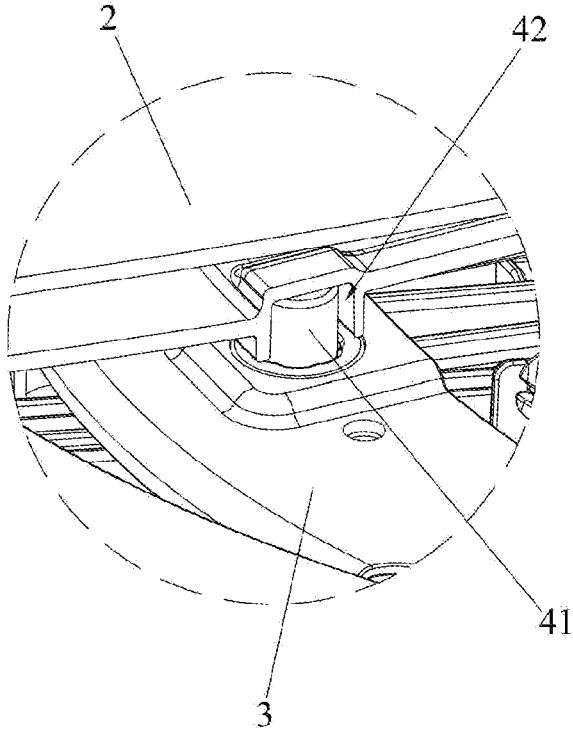
FIG. 5 is an enlarged view of part A in FIG. 4.
Figure 6:
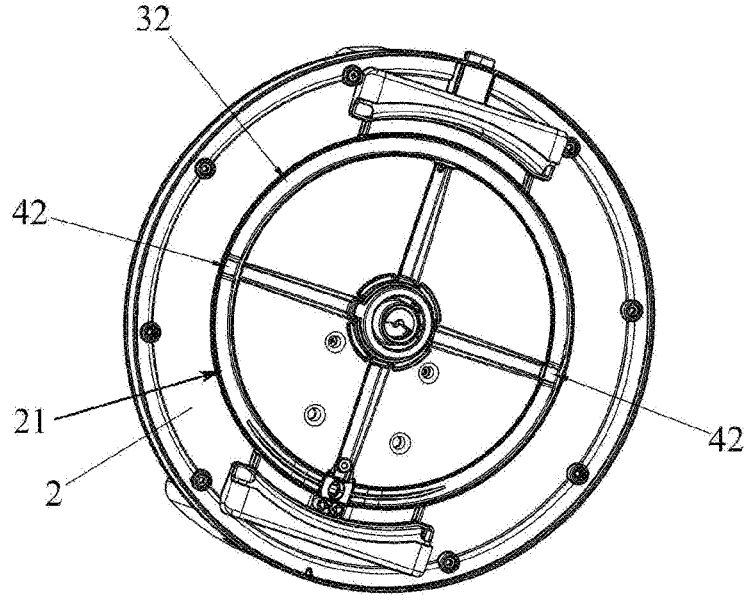
FIG. 6 is a bottom structural view of the base of the child carrier according to the first embodiment of the present disclosure.
Figure 7:
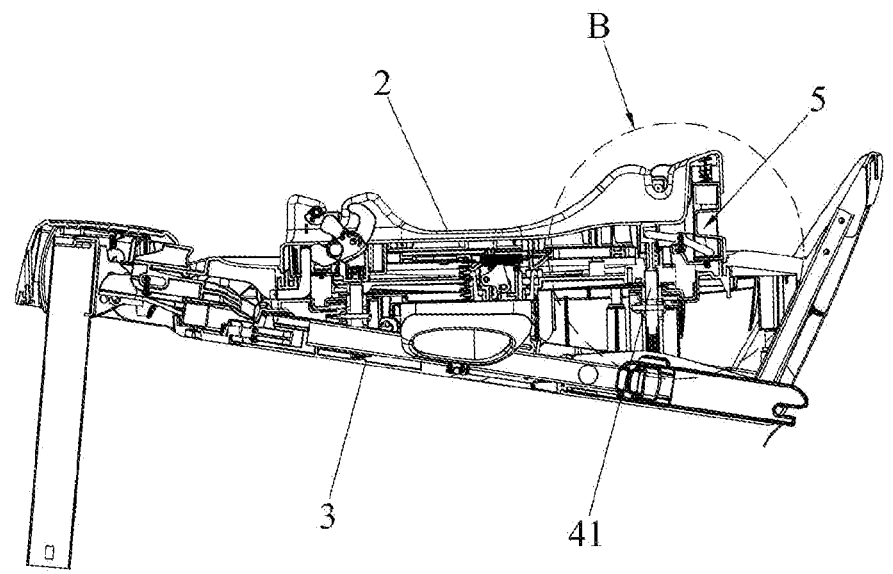
FIG. 7 is a sectional side view of the base and body of the child carrier according to the first embodiment of the present disclosure.

Referring to FIGS. 5 to 7, the lateral rotary positioning mechanism 4 includes an engaging pin 41, an engaging recess 42 and an elastic restoring element 43, and the engaging pin 41 is telescopically arranged in the cavity 31 of the body 3. In this embodiment, engaging pins 41 are symmetrically located on both sides of the cavity 31 of the body 3 in a front-rear direction, respectively. The engaging recesses 42 are arranged on a bottom surface of the base 2 and located on at least one side of the base 2 in the lateral direction (for example, in a substantially left-right direction). In this embodiment, the engaging recesses 42 are symmetrically arranged on both sides of the base 2, that is, positioning on both sides can be realized. Thus, when the child safety seat is mounted on the left or right side of a rear seat of a vehicle (e.g., a car), it is convenient for a child to be taken in or out of the vehicle, which greatly improves the user experience. When the base 2 is rotated to a lateral direction with respect to the body 3, the engaging pin 41 is inserted into the engaging recess 42 to limit rotation of the base 2. The elastic restoring element 43 is arranged between the body 3 and the engaging pin 41 to push the engaging pin 41 into the engaging recess 42. The elastic restoring element 43 is used to enable the engaging pin 41 to automatically be inserted into the engaging recess 42, so that the base 2 can be automatically locked when it turns to the lateral direction (i.e., a lateral state), thereby effectively improving the convenience of use.

As shown in FIG. 6, the bottom surface of the base 2 is provided with an annular guide groove 21 concentric with the base 2, and the engaging recess 42 is arranged in the annular guide groove 21. The annular guide groove 21 may slidably contact with the engaging pin 41 to guide the rotation of the base 2, and may accurately guide the engaging pin 41 to slide into the engaging recess 42, thereby improving the smoothness of rotation and the accuracy of positioning by the pin in the lateral direction.

Figure 8:
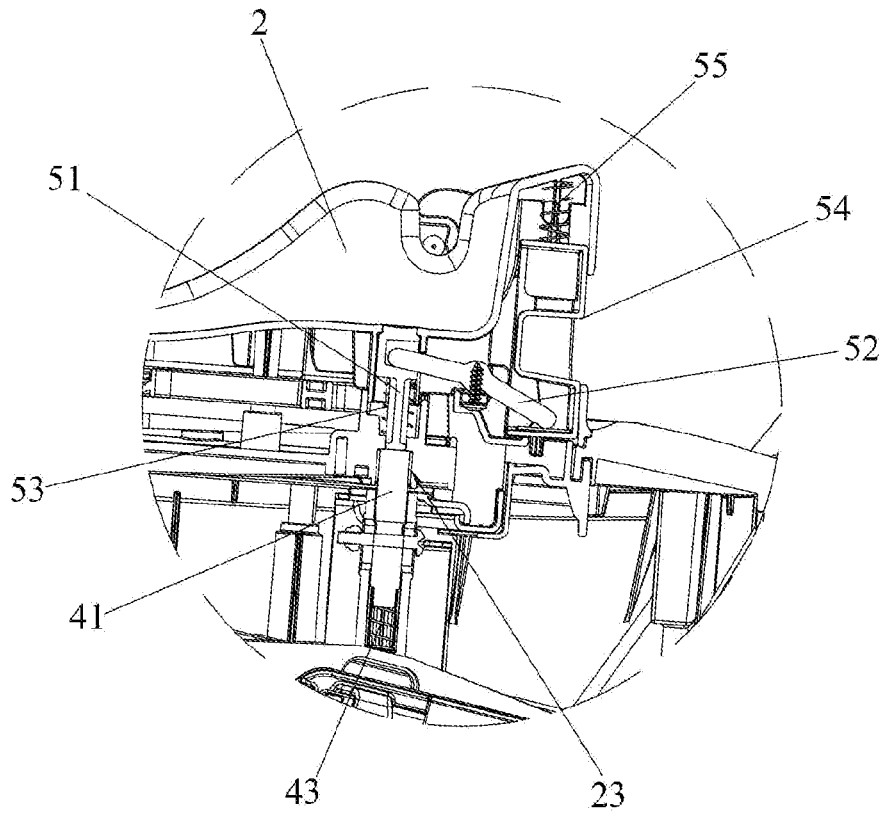
FIG. 8 is an enlarged view of part B in FIG. 7.
Figures 9, 10:
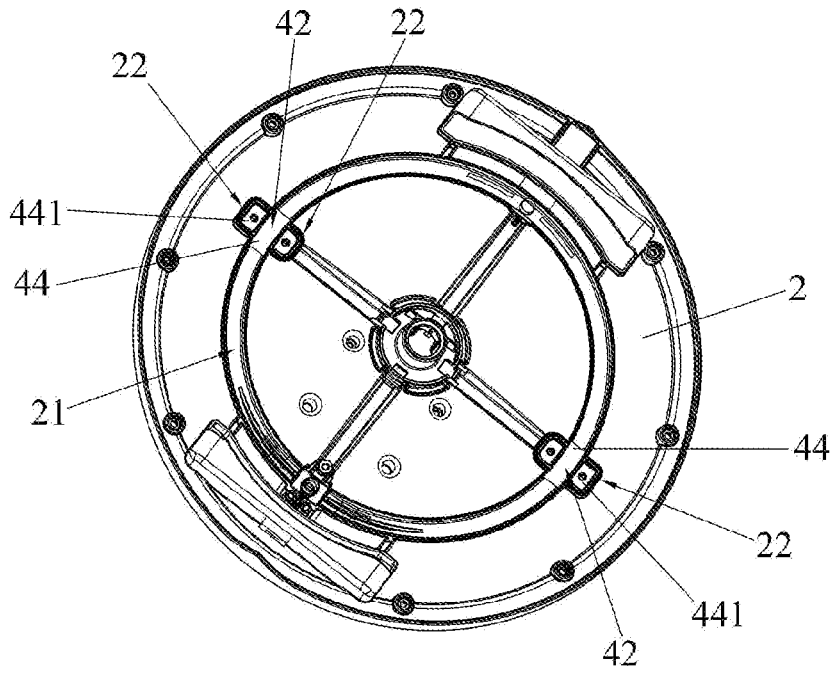
FIG. 9 is a structural view of a base of a child carrier and a positioning block according to a second embodiment of the present disclosure.
FIG. 10 is a structural view of the positioning block of the child carrier according to the second embodiment of the present disclosure.
Figure 11:
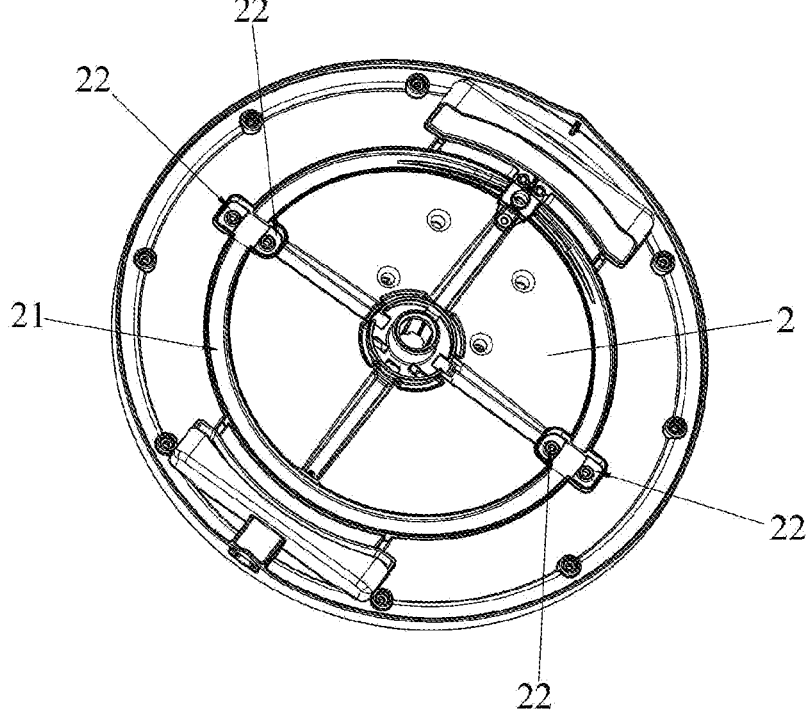
FIG. 11 is a bottom structural view of the base of the child carrier according to the second embodiment of the present disclosure.
Figure 12:
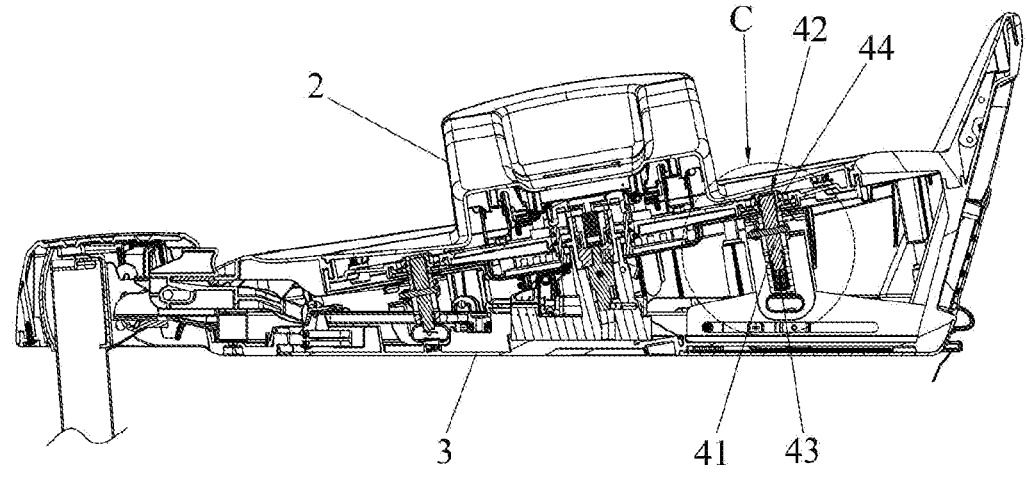
FIG. 12 is a sectional side view of the base and a body of the child carrier according to the second embodiment of the present disclosure.
Figure 13:
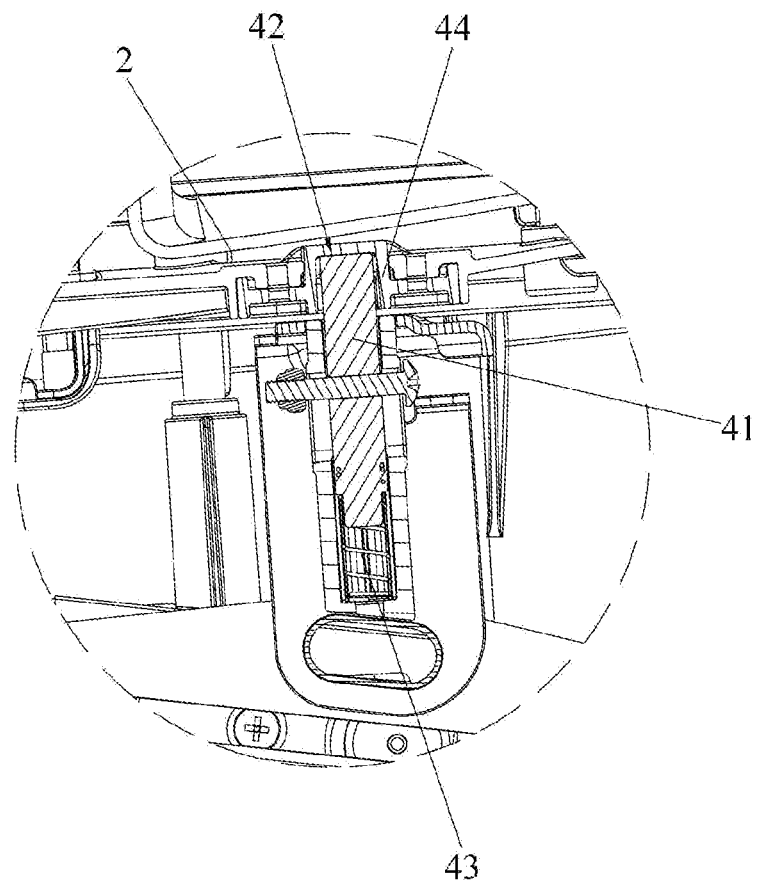
FIG. 13 is an enlarged view of part C in FIG. 12.

As shown in FIG. 8, the bottom surface of the base 2 is provided with a locking hole 23. In this embodiment, the number of the locking hole 23 is one. The locking hole 23 is located on a side of the base 2 in the front-rear direction. When the child carrier 100 is used in the front direction, the locking hole 23 of this embodiment is located on a rear side. When the base 2 is rotated to a front direction with respect to the body 3, the engaging pin 41 located at the rear side of the body 3 is inserted into the locking hole 23 to limit the rotation of the base 2. When the base 2 is rotated to a rear direction with respect to the body 3 (i.e., the child carrier 100 is used in the rear direction), the engaging pin 41 located at a front side of the body 3 is inserted into the locking hole 23 to limit the rotation of the base 2. By arranging the locking hole 23 on the rear or front side of the base 2, the base 2 may be locked by the engaging pin 41 when it is arranged in the front or rear direction, to be positioned in a state of facing the front direction or the rear direction, so that the safety of use can be ensured.

Referring to FIGS. 7 and 8, the base 2 is provided with an unlocking mechanism 5 for driving the engaging pin 41 out of the locking hole 23. By providing the unlocking mechanism 5, the base 2 may be quickly unlocked, thus improving the convenience of operation.

As shown in FIG. 8 again, the unlocking mechanism 5 includes a slider 51, a driving element 52, an elastic element 53, an operating element 54 and a restoring element 55. The slider 51 is slidably disposed on the base 2 to push the engaging pin 41 out of the locking hole 23. A middle part of the driving element 52 is pivotally connected to the base 2, and one end of the driving element 52 is connected with the slider 51, to move the slider 51 when the other end of the driving element 52 is driven. The elastic element 53 is arranged between the base 2 and the slider 51 to restore the slider 51. By providing the elastic element 53, the slider 51 may be automatically away from the engaging pin 41, so that the engaging pin 41 may be automatically locked, and the accidental pushing of the engaging pin 41 can be avoided, thereby improving the safety of operation. The operating element 54 is slidably arranged on a side of the base 2 and connected to the other end of the driving element 52. The operating element 54 is arranged outside the base 2 to facilitate the user's operation and improve the convenience of use. The restoring element 55 is arranged between the base 2 and the operating element 54 to restore the operating element 54. By the arrangement of the restoring element 55, the operating element 54 may be automatically restored, to ensure the effectiveness of operation in every time.

Figure 2:
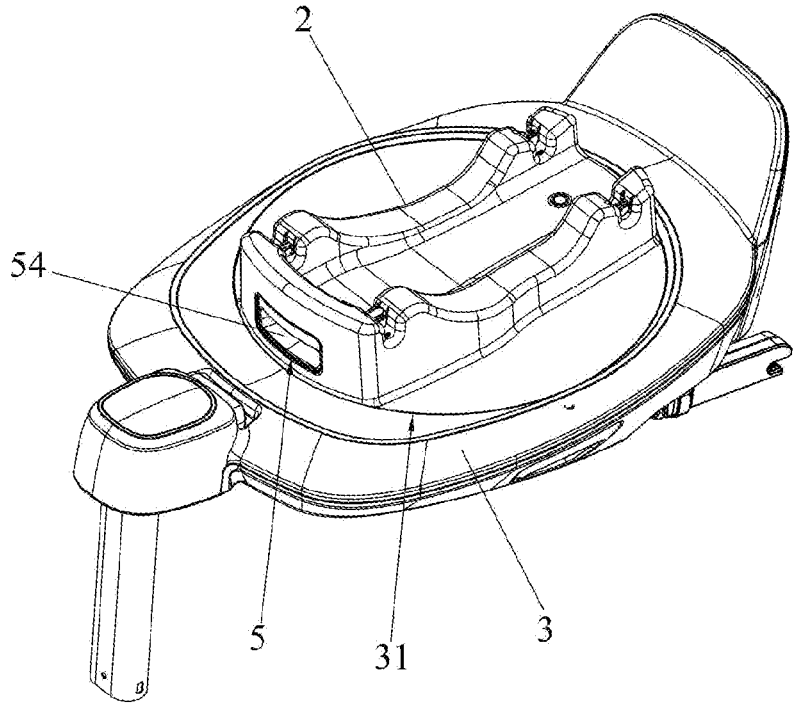
FIG. 2 is a perspective view of a base and a body of the child carrier according to the first embodiment of the present disclosure when it is used in the rear direction.

In conjunction with the above and FIGS. 1 to 3, a working principle of the child carrier 100 of the present disclosure will be described in detail as follows:

First, when the child carrier 100 is used in a rear direction, the locking hole 23 on the base 2 is located at the front side and just corresponds to the engaging pin 41 located at the front side. The elastic element 53 pushes the slider 51 by an elastic force thereof away from the locking hole 23, and the engaging pin 41 is inserted into the locking hole 23 under an elastic force of the elastic restoring element 43, thereby locking the base 2 and restraining the rotation of the base 2. At this time, the carrier main body 1 on the base 2 faces towards the right rear of the body 3, that is, the child carrier 100 is in a state of being used in the rear direction.

When it is desired to use the child carrier 100 in a front direction, the operating element 54 is manually pulled to slide upwards, and the operating element 54 drives one end of the driving element 52 to be swung upwards while the other end of the driving element 52 to be swung downwards. The other end side of the driving element 52 presses against the slider 51, so that the slider 51 moves downward and compresses the elastic element 53. When the slider 51 moves downward close to the locking hole 23, the slider 51 pushes against the engaging pin 41, so that the engaging pin 41 is disengaged from the locking hole 23. At this time, the base 2 can be unlocked, and the base 2 may be rotated by 180 degrees, so that the carrier main body 1 on the base 2 faces a rear direction of the body 3. At the same time, the locking hole 23 is rotated by 180 degrees to directly face the engaging pin 41 located at the front side, and the engaging pin 41 may be inserted into the locking hole 23 after the slider 51 is restored, thereby positioning the base 2. At this time, the child carrier 100 is in a state of being used in the front direction.

When the child needs to get off the car, the child carrier 100 needs to be used in a lateral direction. Therefore, the operating element 54 is manually pulled, so that the engaging pin 41 is pressed through the driving element 52 and the slider 51, and thus the engaging pin 41 is disengaged from the locking hole 23. At this time, the base 2 can be unlocked, and then the base 2 is rotated by 90 degrees, so that the carrier main body 1 faces the lateral direction of the body 3. At the same time, the engaging recesses 42 correspond to the engaging pins 41 one by one, and the engaging pins 41 are inserted into the engaging recesses 42 to temporarily position the base 2. At this time, the carrier main body 1 is in a state of being locked in the lateral direction. When the state needs to be adjusted again, it is only necessary to directly rotate the base 2, and the engaging pin 41 is forced to slide out of the engaging recess 42 under the action of the guiding slope 421. At this time, the base 2 can be unlocked again, and can be adjusted into other states.

Compared with the conventional art, the engaging pin 41 is arranged on the body 3, and the engaging recess 42 is arranged on the bottom surface of the base 2, and located on at least one side of the base 2 in the lateral direction, so that when the base 2 is rotated to the lateral direction with respect to the body 3, the engaging pin 41 may be inserted into the engaging recess 42, so as to achieve an object of limiting the rotation of the base 2, that is, the base 2 can be stably in a state of being in the lateral direction, so that the child can be conveniently taken in or out of the carrier main body 1, thereby improving the user experience and satisfaction, and also avoiding the rotation of the carrier main body 1 in use to prevent the child from falling down so as to ensure the safety of use. In addition, the base 2 can be unlocked only by driving the engaging pin 41 out of the engaging recess 42. Namely, the engaging pin 41 can be disengaged from the engaging recess 42 by directly rotating the carrier main body 1, which is very convenient to use and has a good use experience.

FIGS. 9 to 13 show a structure of a child carrier according to another embodiment of the present disclosure.

The structure of the child carrier of this embodiment is basically the same as that of the above embodiment, except for that the lateral rotary positioning mechanism 4 further includes a positioning block 44 arranged on the bottom surface of the base 2, and a middle part of the positioning block 44 is provided with an engaging recess 42 connected with the annular guide groove 21. As the base 2 is made of plastic materials and has poor wear resistance, the engaging recess 42 directly formed on the base 2 is easily damaged by abrasion due to impact of the engaging pin 41 for a long time. Therefore, the positioning block 44 is provided to reduce speed and degree of abrasion of the engaging recess 42 and prolong its service life. Moreover, the positioning block 44 is a wear-resistant positioning block made of wear-resistant materials, specifically being a positioning block made of POM (polyoxyethylene resin) material, of course, a positioning block made of PA (polyamide), PEI (polyethyleneimine) or other materials. Secondly, even if the abrasion occurs, it can be quickly and conveniently replaced. A mounting part 441 is disposed on both ends of the positioning block 44, respectively, and a mounting groove 22 is arranged on the bottom surface of the base 2, and the mounting part 441 is embedded into the mounting groove 22, to be connected to the bottom surface of the base 2. The mounting groove 22 is located at both sides of the annular guide groove 21, respectively. By combination of the mounting groove 22 and the mounting part 441, the positioning block 44 may be accurately and quickly assembled with the base 2, to improve the convenience of assembly and maintenance. The mounting part 441 and the base 2 may be connected by screw connection, bolt connection, snap connection, bonding or welding connection. The mounting part 441 of this embodiment is provided with a mounting hole 441*a*, and after the mounting part 441 is embedded in the mounting groove 22, the mounting part 441 is connected to the bottom surface of the base 2 in a manner that a screw passes through the mounting hole 441*a*. In addition, both sides of the engaging recess 42 are provided with a guiding slope 421, respectively, for guiding the engaging pin 41 to move in or out. By providing the guiding slope 421, the guiding slope 421 may guide the engaging pin 41, and therefore, when the base 2 is rotated, the guiding slope 421 may be used to force the engaging pin 41 to separate from the engaging recess 42, to achieve the purpose of quick unlocking and improving the convenience of operation. The child carrier of this embodiment has advantageous effects as same as those of the first embodiment, and the description will not be repeated herein.

The structure of the carrier main body 1 of the child carrier 100 according to the present disclosure is well known to those skilled in the art, and will not be described in detail herein.

The description that has been disclosed above is only preferred examples of the present disclosure, which of course should not be used to limit the scope of the present disclosure. Therefore, equivalent changes made according to the scope of the present disclosure still belong to the scope covered by the present disclosure.

What is claimed is:

1. A lateral rotary positioning mechanism arranged between a base and a body on which the base is rotatably arranged, the lateral rotary positioning mechanism comprising:

an engaging pin telescopically arranged on the body, and an engaging recess arranged on a bottom surface of the base and located on at least one side of the base in a lateral direction, wherein when the base is rotated to a lateral direction with respect to the body, the engaging pin is inserted into the engaging recess.

2. The lateral rotary positioning mechanism according to claim 1, further comprising an elastic restoring element arranged between the body and the engaging pin.

3. The lateral rotary positioning mechanism according to claim 1, wherein the bottom surface of the base is provided with an annular guide groove concentric with the base, and the engaging recess is arranged within the annular guide groove.

4. The lateral rotary positioning mechanism according to claim 1, wherein the lateral rotary positioning mechanism further comprises a positioning block arranged on the bottom surface of the base, and provided with the engaging recess.

5. The lateral rotary positioning mechanism according to claim 4, wherein a mounting part is arranged on each of both ends of the positioning block, and is connected to the bottom surface of the base.

6. The lateral rotary positioning mechanism according to claim 5, wherein the bottom surface of the base is provided with mounting grooves, and the mounting parts are embedded in the mounting grooves.

7. The lateral rotary positioning mechanism according to claim 6, wherein the mounting part and the base are connected in a manner of a screw connection, bolt connection, snap connection, bonding or welding.

8. The lateral rotary positioning mechanism according to claim 4, wherein the positioning block is a wear-resistant positioning block made of wear-resistant materials.

9. The lateral rotary positioning mechanism according to claim 1, wherein a guiding slope is arranged on each of both sides of the engaging recess.

10. A child carrier comprising:

a carrier body, a base, a body, and a lateral rotary positioning mechanism, the carrier body is arranged on the base, and the base is rotatably arranged on the body about a central axis of the base;

the lateral rotary positioning mechanism comprises:

an engaging pin telescopically arranged on the body, and an engaging recess arranged on a bottom surface of the base and located on at least one side of the base in a lateral direction, wherein when the base is rotated to a lateral direction with respect to the body, the engaging pin is inserted into the engaging recess.

11. The child carrier according to claim 10, wherein the bottom surface of the base is provided with a locking hole, and the locking hole is located at front or rear side of the base, and when the base is rotated to a rear direction or a front direction with respect to the body, the engaging pin is inserted into the locking hole.

12. The child carrier according to claim 11, wherein the base is provided with an unlocking mechanism for driving the engaging pin out of the locking hole.

13. The child carrier according to claim 12, wherein the unlocking mechanism comprises a slider slidably arranged on the base.

14. The child carrier according to claim 13, wherein the unlocking mechanism further comprises a driving element, a middle part of the driving element is pivotally connected to the base, and one end of the driving element is connected with the slider.

15. The child carrier according to claim 13, wherein the unlocking mechanism further comprises an elastic element arranged between the base and the slider.

16. The child carrier according to claim 14, wherein the unlocking mechanism further comprises an operating element which is arranged on a side of the base and connected with the other end of the driving element.

17. The child carrier according to claim 16, wherein the unlocking mechanism further comprises a restoring element arranged between the base and the operating element.

\* \* \* \* \*